United States Patent [19]

Rosenberg

[11] Patent Number: 4,889,154
[45] Date of Patent: Dec. 26, 1989

[54] AUTOMATIC SHUT-OFF VALVE

[76] Inventor: Peretz Rosenberg, Moshav Beit Shearim, Israel

[21] Appl. No.: 174,560

[22] Filed: Mar. 29, 1988

[30] Foreign Application Priority Data

Mar. 31, 1987 [IL] Israel ........................................ 82062
Mar. 2, 1988 [IL] Israel ........................................ 85605

[51] Int. Cl.$^4$ ............................................. F16K 17/04
[52] U.S. Cl. ..................................... 137/474; 137/506
[58] Field of Search ................................ 137/474, 506

[56] References Cited

U.S. PATENT DOCUMENTS 4,192,343 3/1980 Grahac ................................. 137/474

Primary Examiner—Robert G. Nilson
Attorney, Agent, or Firm—Benjamin J. Barish

[57] ABSTRACT

An automatic shut-off valve having a lower closing pressure than an opening pressure comprises a housing having a partition formed with a valve opening connecting the inlet to the outlet, a valve member movable in the outlet side of the partition to an open or closed position with respect to the valve opening, and a piston movable in the outlet side of the partition independently of the valve member and defining a chamber with the valve member. The piston is urged by a spring tending to close the valve member against the force of inlet pressure. The piston is formed with a passageway establishing communication between the engine chamber and the housing outlet, and has a larger cross-sectional area than the valve member, such that the valve member opens the valve opening at a predetermined inlet pressure and closes the valve opening at a lower inlet pressure.

17 Claims, 3 Drawing Sheets

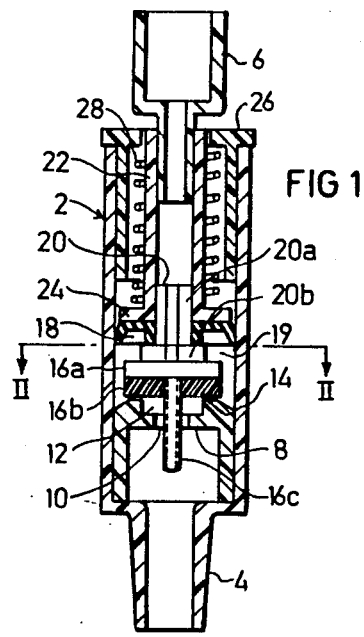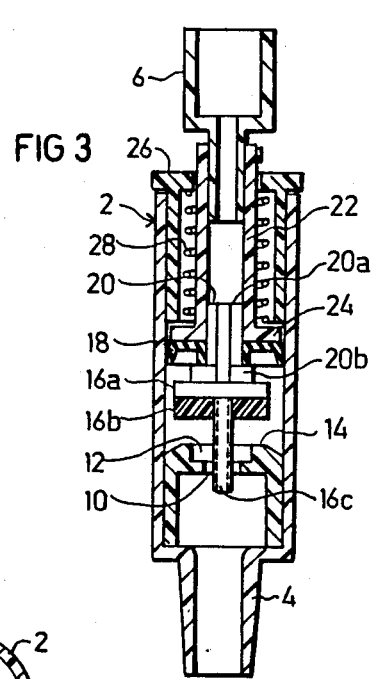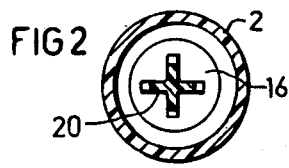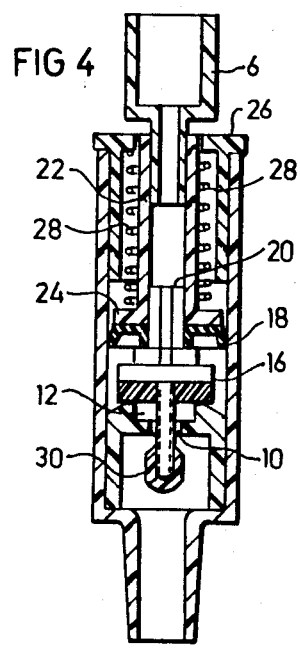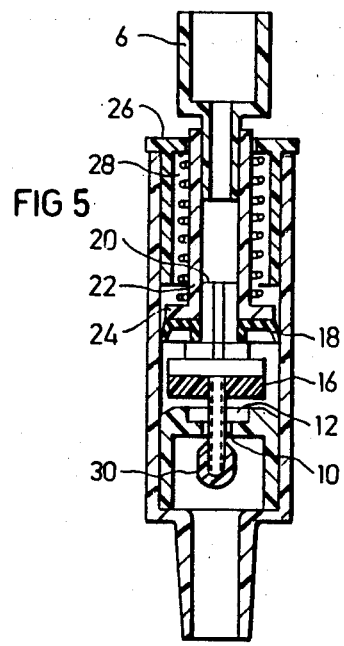

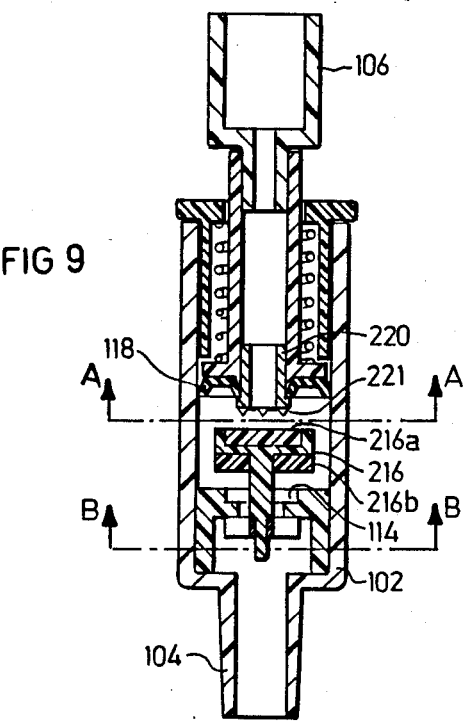
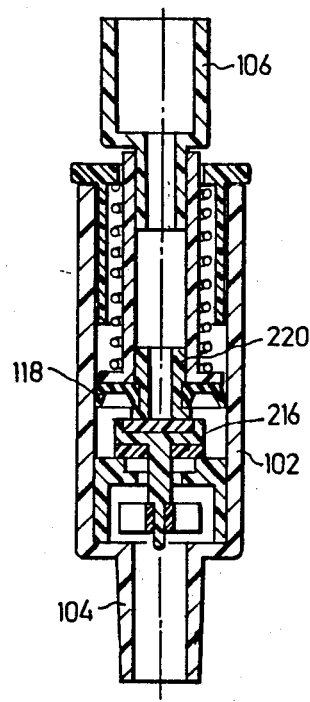
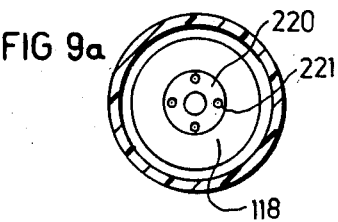
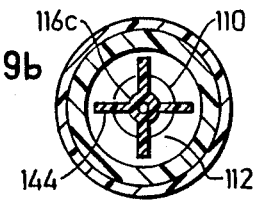

AUTOMATIC SHUT-OFF VALVE

BACKGROUND OF THE INVENTION

The present invention relates to an automatic shut-off valve, and also to a pressure-regulator including such valve. The invention is particularly useful in water irrigation systems, and is therefore described below with respect to this application, but it will be appreciated that the invention could advantageously be used in other applications as well.

One type of water irrigation system with respect to which the invention is particularly useful is one including a plurality of water sprinklers each of which is equipped with an automatic shut-off valve such that all the water sprinklers will automatically be turned on when the inlet pressure reaches a predetermined value and will be automatically turned off when the inlet pressure drops to a predetermined low value. Such water irrigation systems, particularly those involving a long line of water sprinklers, frequently include a pressure regulator to assure that all the water sprinklers will operate at the same pressure irrespective of the pressure drop along the length of the line.

An object of the present invention is to provide an automatic shut-off valve of the foregoing type made of a few simple parts which can be produced and assembled in volume and at low cost. Another object of the invention is to provide such a valve in which the closing pressure can be changed in a simple and inexpensive manner. A further object of the invention is to provide an automatic shut-off valve which can, by the addition of a simple part, be converted for use also as a pressure regulator to regulate the outlet pressure.

BRIEF SUMMARY OF THE INVENTION

According to the present invention, there is provided an automatic shut-off valve having a lower closing pressure than an opening pressure, comprising: a housing having an inlet, an outlet, and a partition formed with a valve opening connecting the inlet to the outlet; a valve member movable in the outlet side of the partition to an open or closed position with respect to the valve opening; and a piston movable in the outlet side of the partition independently of the valve member and defining a chamber with the valve member. The piston is formed with a passageway therethrough establishing communication between the housing outlet and the chamber. The piston includes a spacer stem in the passageway and engageable with the valve member for spacing the piston from the valve member, the spacer stem being formed with a flow path axially therethrough establishing communication between the chamber and the outlet of the housing. The shut-off valve further includes a spring urging the piston towards the valve member and the valve member to its closed position against the force of the inlet pressure. The piston has a larger cross-sectional area than the valve member, such that the valve member opens the valve opening at a predetermined inlet pressure and closes the valve opening at a lower inlet pressure According to an important feature in the preferred embodiments of the invention described below, the partition is in the form of a removable insert in the housing enabling the closing pressure to be changed by merely changing the insert.

Automatic shut-off valves constructed in accordance with the foregoing features provide a number of important advantages. Thus, such valves may be a constructed of a few simple parts which can be produced in volume and at low cost. In addition, the closing pressure of the valve can be changed by merely changing the removal insert in the valve housing; this substantially reduces the initial cost to produce a line of such valves having different pressure-closing characteristics, as well as the inventory costs in maintaining and repairing such valves in the field. In addition, the shut-off valve can be easily converted so as also to perform a pressure-regulator function by merely adding a simple regulator member to the valve stem.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view illustrating one form of automatic shut-off valve constructed in accordance with the present invention, the valve being shown in its closed position;

FIG. 2 is a transverse sectional view along line II—II of FIG. 1;

FIG. 3 is a view similar to that of FIG. 1 but showing the valve in its open position;

FIG. 4 is a view of the valve of FIG. 1 but with the addition of a regulator member for adding a pressure-regulator function to the valve, the valve being shown in its closed position;

FIG. 5 is a view similar to that of FIG. 4 but showing the valve in its open position

FIGS. 8 and 9 are view corresponding to those of FIGS. 6 and 7 but illustrating another construction in accordance with the invention of the present application; and FIGS. 9a and 9b are sectional views along lines a—a and b—b of FIG. 9.

DESCRIPTION OF PREFERRED EMBODIMENTS

1. The Embodiment of FIGS. 1-3

Figure 7:
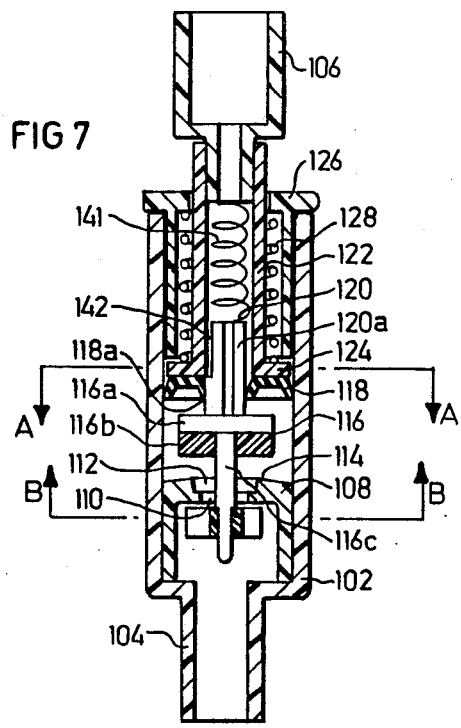
FIGS. 6 and 7 are longitudinal sectional views illustrating another shut-off valve constructed in accordance with the invention, FIG. 6 illustrating the valve in its fully closed condition, and FIG. 7 illustrating the valve in its fully open condition.

The valve illustrated in FIGS. 1-3 of the drawings is an automatic shut-off valve which opens at a predetermined inlet pressure and closes at a predetermined outlet pressure substantially lower than that of the inlet pressure. For example, the valve may automatically open at an inlet pressure of 2.0 atmospheres and automatically close at a pressure of 0.5 atmospheres.

The valve illustrated in FIGS. 1-3 comprises a cylindrical housing 2 which is reduced in diameter at one end to define an inlet 4. The outlet from the housing is at the opposite end and carries a socket 6 for receiving, or being connected to, the device to be supplied with the water (or other fluid) inletted into the housing.

Housing 2 further includes a partition 8 formed with a valve opening connecting the inlet 4 to the outlet socket 6. This valve opening in partition 8 is constituted of a first bore 10 of relatively small diameter, and a second bore 12 of larger diameter, the latter bore being circumscribed by a valve seat 14.

A valve member 16 is disposed within housing 2 on the outlet side of partition 8 and is movable with respect to valve seat 14 so as to close (FIG. 1) or to open (FIG. 3) bore 12 through the partition. Valve member 16 includes a disc 16a, a sealing ring 16b bonded to the underface of disc 16a, and a stem 16c projecting through bore 12 and bore 10 in partition 8. Stem 16c is of smaller diameter than bore 10 so as always to maintain fluid communication between the inlet side 4 of partition 8 and bore 12 of the partition.

A piston 18 is disposed within housing 2 and is movable in the outlet side of partition 8 independently of valve member 16. Piston 18 thereby defines a chamber 19 between the piston and valve member 16. Piston 18 is formed with a central aperture defining a passageway therethrough which receives a spacer member 20 formed with a stem 20a passing through the piston, and with an enlarged head 20b in chamber 9. Both stem 20a and head 20b are formed with a plurality of axially-extending, circumferentially-spaced ribs defining a flow path axially through the spacer stem establishing communication between chamber 19 and the housing outlet 6.

Spacer stem 20a is received within a cylindrical sleeve 22 formed with an annular flange 24 at one end in contact with piston 18. The opposite end of sleeve 22 projects through the outlet opening in end wall 26 of housing 2 and receives the outlet socket member 6. A spring 28 is interposed between flange 24 and the end wall 26 of housing 2. Spring 28 thus urges piston 18, and thereby also valve member 16, to the closed position of the valve member wherein its sealing ring 16b firmly engages valve seat 14 circumscribing bore 12 in partition 8.

As can be clearly seen in FIG. 1, the outer diameter of piston 18 is substantially larger than the diameter of valve seat 14 closed by valve member 16. This causes the valve to open at a predetermined inlet pressure, determined by the cross-sectional area of valve seat 14, and to close at a substantially smaller inlet pressure, determined by the larger cross-sectional area of piston 18.

The valve illustrated in FIGS. 1-3 operates as follows.

Before the water supply is turned on, the valve member 16 will be in its closed position as illustrated in FIG. 1 under the force of spring 28. When the water supply is turned on, the inlet pressure is applied to the sealing ring 16b of valve member 16, and when the inlet pressure multiplied by the cross-sectional area of the valve seat 14, is sufficient to overcome the force of spring 28, valve member 16 will open. As soon as it opens, the inlet pressure is applied via chamber 19 to the piston 18, which is of larger cross-sectional area than that of valve seat 14, so that a substantially larger force will be immediately applied opposing spring 28, thereby producing a very quick opening of the valve member as soon as inlet pressure reaches a predetermined value.

Because of the large force produced by the inlet pressure against piston 18, the valve will remain open until the inlet pressure drops to such a low value that it, multiplied by the larger surface area of piston 18, is no longer able to overcome the force of spring 28. When the inlet pressure drops to this low pressure, substantially lower than the opening pressure, spring 28 will automatically move piston 18 and valve member 16 to cause sealing ring 16b of the valve member to firmly seat against valve seat 14.

As one example, bore 12 circumscribed by valve seat 14 could be 5 mm in diameter, and piston 18 could be 10 mm in diameter. Since the surface area varies according to the square of the diameter, the surface area of bore 12 would be one-fourth the surface area of piston 18, so that the closing pressure would be one-fourth the opening pressure. For example, if the valve is designed to automatically open at 2.0 atmospheres, in such an arrangement it would automatically close at 0.5 atmospheres.

As shown in FIG. 1, partition 8 having the connecting bore 12 is in the form of a removable insert. Accordingly, in order to change the relationship between the opening and closing pressures, it is only necessary to change this insert. If it is desired to change the absolute values of opening and closing pressures, this can be done by merely changing spring 28.

2. The Embodiment of FIGS. 4 and 5

FIGS. 4 and 5 illustrate how the automatic shut-off valve of FIGS. 1-3 may be converted to perform not only the automatic closing and opening functions described above, but also a pressure-regulator function, to maintain the outlet pressure at a predetermined regulated value. For this purpose, it is only necessary to add regulator 30 to stem 16c of the valve member 16, such that the regulator member is disposed on the inlet side of partition 8 and moves towards and away from the small-diameter bore 10 through partition 8. Since the shut-off valve illustrated in FIGS. 4 and 5 is otherwise the same as in FIGS. 1-3, the same reference numbers have been applied so as to facilitate comparison.

Thus, the valve-regulator illustrated in FIGS. 4 and 5 operates in the same manner as described above with respect to FIGS. 1-3 for automatically opening and closing the valve. When the valve is open, as shown in FIG. 5, the inlet pressure applied to piston 18 will displace it and valve member 16 against the action of spring 28, so that as the inlet pressure increases, regulator member 30 will move closer to the small-diameter bore 10 in partition 8 to restrict its cross-sectional area and thereby to decrease the flow through it. On the other hand, when the inlet pressure drops, regulator member 30 will move away from bore 10 to increase the flow therethrough.

In this application of the invention, the diameter of bore 10 influences the output rate, and the force of spring 28 influences the regulated outlet pressure. Thus, if the output rate is to be changed, this can easily be done by changing insert 8 to one having a bore 10 of the appropriate dimensions; and if the outlet pressure is to be changed, this can be conveniently done by changing the spring 28.

3. The Embodiment of FIGS. 6 and 7

Figure 6:
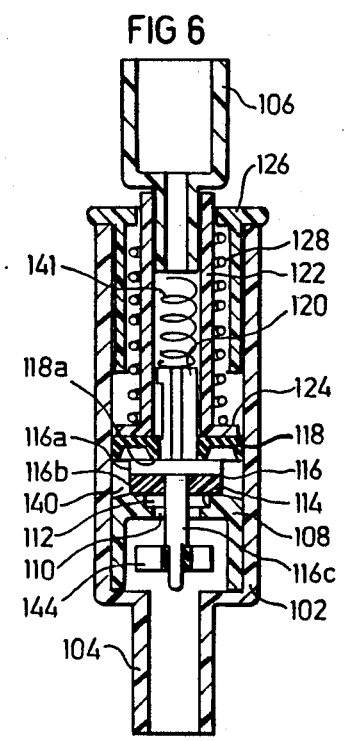

The shut-off valve illustrated in FIGS. 6 and 7 is of similar structure as in FIGS. 1-5, but includes a number of changes as will be described more particularly below. To facilitate understanding, the corresponding parts have been identified by the same reference numerals but increased by "100".

Thus, the valve illustrated in FIGS. 6 and 7 comprises a cylindrical housing 102 reduced in diameter at one end to define an inlet 104. The outlet from the housing is at the opposite end and carries a socket 106 for receiving, or for connection to, the device to be supplied with the water or other fluid (e.g. a water sprinkler) inletted into the housing.

Housing 102 further includes a partition 108 formed with a valve opening connecting the inlet 104 to the outlet socket 106. This valve opening in partition 108 is constituted of a first bore 110 of relatively small diameter, and a second bore 112 of larger diameter, the latter being circumscribed by a valve seat 114.

A valve member 116 is disposed within housing 102 on the outlet side of partition 108 and is movable with respect to valve seat 114 so as to close (FIG. 6) or to open (FIG. 7) bore 112 through the partition. Valve member 116 includes a disc 116a on its outlet face, a sealing ring 116b on its inlet face, and a stem 116c projecting through bores 112 and 110 in partition 108. Stem 116c is of smaller diameter than bore 110 so as always to maintain fluid communication between the inlet side of partition 108 and bore 112.

Figure 7A:
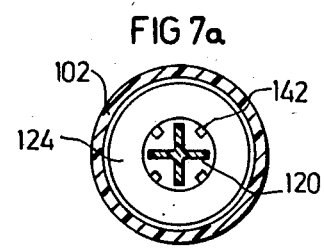
FIGS. 7a and 7b are sectional views along lines a—a and b—b of FIG. 7.

A piston 118 is disposed within housing 102 and defines a chamber 119 between it and the outlet face 116a of valve member 116. Piston 118 is formed with a central aperture defining a passageway which receives a spacer member 120 formed with a stem 120a having a plurality of axially-extending, circumferentially-spaced ribs to define a flow path axially through the spacer member, as shown particularly in FIG. 7a, to establish communication between chamber 119 and the outlet 106.

Spacer stem 120a is received within a cylindrical sleeve 122 formed with an annular flange 124 at one end in contact with piston 118. The opposite end of sleeve 122 projects through the outlet opening in end wall 126 of the housing 102, and receives the outlet socket member 106. A spring 128 is interposed between flange 124 and the end wall 126 of housing 102.

As in the shut-off valve described in FIGS. 1–5, the outer diameter of piston 118 is substantially larger than the diameter of valve seat 114 closed by valve member 116. This causes the valve to open at a relatively high inlet pressure determined by the cross-sectional area of valve-seat 114, and to close at a substantially smaller inlet pressure determined by the larger cross-sectional area of piston 118.

The shut-off valve illustrated in FIGS. 6 and 7, however, differs in a number of respects from those described in FIGS. 1–5.

One important difference is that the spacer stem 120a is not fixed with respect to the piston 118, but rather is movable with respect to the piston. Spacer stem 120a is movable with valve member 116, and therefore may be integrally formed with its outlet face (disc 116a) but may also be separate from it. The arrangement is such that the inlet face (sealing ring 116b) of valve member 116 cooperates with valve seat 114 to define an inlet valve in which seat 114 constitutes the inlet valve seat; whereas, piston 118 cooperates with the outlet face (disc 116a) of valve member 116 to define an outlet valve, in which the peripheral edge 118a of the piston bordering its aperture receiving the spacer stem 120a, constitutes the outlet valve seat.

The shut-off valve illustrated in FIGS. 6 and 7 further includes a second spring, therein designated 141, disposed within the sleeve 122 and tending to urge spacer stem 120a towards valve member 116. Spring 141 is normally disposed in the upper end of sleeve 122. The lower end of the sleeve is formed with a plurality of axially-extending circumferentially-spaced ribs 142 (see particularly FIG. 7a) which engage the bottom end of spring 141, preventing the spring from applying a force to spacer stem 120a, in the fully open position of sleeve 122 and its piston 118. That is, the circumferentially-spaced ribs 142 serve as stop elements formed at the end of sleeve 122 engageable by the end of spring 141 to isolate the spring from the spacer member 120 when the spacer member is in its open position with respect to piston 118. Spring 141 is a relatively light spring, compared to spring 128, and applies a substantially lower force to spacer stem 120a than the force applied by spring 128 to sleeve 122 and its piston 118.

Figure 7B:
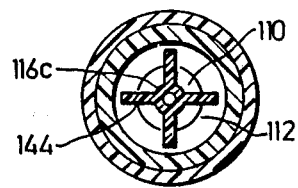

The shut-off valve illustrated in FIGS. 6 and 7 does not include the pressure-regulator member (30, FIGS. 4 and 5), but rather includes a limit member 144 fixed to the end of valve stem 116c and cooperable with partition 108 to limit the fully open position of the valve member 116, as shown in FIG. 7. Limit member 144 is of a cross-configuration (see FIG. 7b) providing flow passageways through the inlet bores 110 and 112 when bearing against the underface of partition 108.

The shut-off valve illustrated in FIGS. 6 and 7 operates as follows:

Before the water supply is turned on, spring 128 presses sleeve 122 downwardly so that the inlet valve, defined by inlet seat 114 and the inlet 116b of valve member 116, as well as the outlet valve defined by the opposite face 116a of valve member 116 and edge 118a of piston 118, are both closed.

When the water supply is turned on, the inlet pressure is applied to the inlet 116b of valve member 116; and when the inlet pressure multiplied by the cross-sectional area of the inlet valve seat 114 is sufficient to overcome the force of spring 128, valve member 116 starts to open. As soon as it opens slightly, a pressure is built up in chamber 119 between partition 108 and piston 118, causing piston 118 to move upwardly.

Valve member 116 moves upwardly with piston 118, and therefore the inlet valve defined by the inlet valve seat 114 opens, but the outlet valve defined by the peripheral edge 118a of piston 118 bordering its opening remains closed until stop 144 engages the underface of partition 108. At this time, the inlet valve is completely open, and then the outlet valve (piston peripheral edge 118a) starts to open. A large force is applied to piston 118 during this opening movement of the valve because of the larger cross-sectional area of the piston (as compared to that of the inlet valve seat 114) while the inlet valve was closed, so that piston 118 moves rapidly to its open position with respect to valve member 116 until flange 124 limits against the end of sleeve 122.

In this open position of the shut-off valve, as illustrated in FIG. 7, spring 141 projects the spacer stem 120a outwardly through piston 118, thereby maintaining valve member 116 spaced from the peripheral edge 118a of piston 118 receiving the valve stem. The fluid (e.g. water) thereby flows to the outlet via the space between the ribs 142 of the spacer stem 120a. In addition, ribs 142 formed within sleeve 122 isolate the spring 141 from applying pressure against valve member 116, thereby preventing loss of incoming pressure.

Because of the large force produced by the inlet pressure against piston 118, the shut-off valve will remain open until the inlet pressure drops to such a low value that it, multiplied by the larger surface area of piston 118, is no longer able to overcome the force of spring 128. When the inlet pressure drops to this low value, spring 128 moves the piston 118 and its sleeve 122 towards valve member 116. At the same time, spring 141 moves the spacer stem 120a towards the valve disc 116b, such that the inlet valve seat 114 is closed by the lower face of valve member 116. This closes one end of the intermediate chamber 119 to the incoming pressure, but its opposite end is still open by the spacing of piston 118 from the opposite face of valve member 116 to relieve the pressure within the chamber. Accordingly, spring 128 moves piston 118 to the final closing position, as illustrated in FIG. 6.

When the inlet pressure is increased, tending to open the shut-off valve, the inlet valve, constituted by the inlet 116b of valve member 116 cooperable with the inlet valve seat 114, first opens; and then the outlet valve, constituted by the opposite face 116a of valve member 116 cooperable with peripheral edge 118a of piston 118, closes. Thus, when the inlet pressure drops to close the shut-off valve, the inlet valve is first closed and then the outlet valve is closed. This assures a release of pressure within chamber 119, and a positive and full opening and closing of the shut-off valve.

While the valve is open, the ribs 142, engaging the light spring 141, prevent the spring from reducing the opening of the shut-off valve, and thus prevent the loss of incoming pressure; when the shut-off valve is closed, spring 141 reduces the force on the piston 118 but adds the same force to the closing force on valve 114. The described arrangement thus does not change the designed opening force determined by the force of spring 128 and the area of the inlet valve seat 114.

It will be seen that in the embodiment of FIGS. 6 and 7, the light spring 141 constitutes yieldable means which acts on the inlet and outlet valves to cause the inlet valve to open before the outlet valve upon an increase in the inlet pressure, and to close before the outlet valve upon a decrease in the inlet pressure, thereby producing a more positive opening and closing of the shut-off valve by preventing a build-up of pressure within chamber 119.

4. The Embodiment of FIGS. 8 and 9

This embodiment illustrates another form of yieldable means which may be used for performing the same function as described in the preceding paragraph.

Thus, the shut-off valve illustrated in FIGS. 8 and 9 is basically of the same construction as described above with respect to FIGS. 6 and 7, and therefore corresponding parts are correspondingly numbered to facilitate understanding. The basic difference in the construction of the valve of FIGS. 8 and 9 over that of FIGS. 6 and 7 is that the light spring 141 of the FIGS. 6 and 7 construction is omitted, and instead the spacer stem, designated 220 in FIGS. 8 and 9, is formed with a plurality of axially-extending projections 221; also the outlet face 216a of the valve member 216 is formed of resilient material which yields when pressed into firm contact with the projections 221 to close the outlet valve between the peripheral edge of piston 118 and the outlet face 216a of valve member 216.

In the shut-off valve illustrated in FIGS. 8 and 9, the inlet (lower) face 216b of valve member 216 forms an inlet valve with valve seat 114, and the peripheral edge of piston 118 forms an outlet valve with the outlet face 216a of valve member 216. It will be seen that the projections 221 formed on the end of spacer stem 220, engageable with the resilient outlet face 216a of valve member 216, serve basically the same function of the light spring 141 in the FIGS. 6 and 7 embodiment; thus they cause the inlet valve to open before the outlet valve upon an increase in the inlet pressure, and to close before the outlet valve upon a decrease in the outlet pressure. Accordingly, the valve construction of FIGS. 3 and 4 also produces a more positive opening and closing of the shut-off valve by preventing a build-up of pressure within chamber 119.

While the invention has been described with respect to several preferred embodiments, it will be appreciated that many other variations, modifications and applications of the invention may be made.

What is claimed is:

1. An automatic shut-off valve having a lower closing pressure than an opening pressure, comprising: a housing having an inlet, an outlet, and a partition formed with a valve opening connecting the inlet to the outlet; a valve member movable in the outlet side of the partition to an open or closed position with respect to said valve opening; a piston movable in the outlet side of said partition independently of said valve member and defining a chamber with said partition; said piston being formed with a passageway therethrough establishing communication between the housing outlet and said chamber; said piston including a spacer stem in its passageway and engageable with said valve member for spacing the piston from said valve member, said spacer stem being formed with a flow path axially thereof establishing communication between said chamber and the outlet of said housing; and a spring urging said piston towards the valve member and the valve member to its closed position against the force of the inlet pressure; said piston having a larger cross-sectional area than said valve member, such that the valve member opens the valve opening at a predetermined inlet pressure and closes the valve opening at a lower inlet pressure.

2. The valve according to claim 1, wherein said partition is in the form of a removable insert in said housing enabling the opening pressure to be changed by merely changing said insert.

3. The valve according to claim 1, further including a sleeve coupled to said piston in communication with the passageway therethrough and defining the outlet of said housing; said spring being interposed between said sleeve and said housing.

4. The valve according to claim 3, wherein said valve member is of disc configuration and includes an annular sealing ring seatable against the valve opening on the outlet side of said partition.

5. The valve according to claim 3, wherein said sleeve is formed with an annular flange at the end thereof adjacent to said piston, said spring being interposed between said annular flange on the sleeve and an end wall at the outlet end of the housing.

6. The valve according to claim 5, further including an outlet connector carried by said sleeve.

7. The valve according to claim 1, wherein said spacer stem is formed with a plurality of axially-extending, circumferentially-spaced ribs defining said flow path axially through the spacer stem.

8. The valve according to claim 7, wherein said spacer stem is fixed to said piston and includes an enlarged head also formed with said plurality of ribs and engageable with said valve member for spacing the piston from the valve member.

9. The valve according to claim 1, wherein said valve member includes an inlet face and an outlet face, and wherein the spacer stem is movable with respect to the piston so as to permit the piston to move with respect to the valve member and thereby to define an outlet valve with respect to the outlet face of the valve member; the inlet face of the valve member defining an inlet valve with the opening formed in the partition; the shut-off valve further including yieldable means acting on said inlet and outlet valves and effective to cause the inlet valve to open before the outlet valve upon an increase in the inlet pressure, and to close before the outlet valve upon a decrease in the inlet pressure, thereby producing a more positive opening and closing of the shut-off valve by preventing a build-up of pressure in said chamber.

10. The valve according to claim 9, wherein said valve member is formed with a stem passing through said valve opening in the partition to the inlet side of the housing, said stem carrying a limit member cooperable with the partition to limit the fully opened position of the valve member.

11. The valve according to claim 9, wherein said yieldable means comprises a relatively light spring urging said spacer stem towards said valve member to thereby space the outlet face of the valve member from said piston.

12. The valve according to claim 11, wherein said sleeve is formed with a stop element engageable by the end of said second spring to isolate the spring from the spacer member when the spacer member is in its open position with respect to said piston.

13. The valve according to claim 9, wherein said yieldable means is interposed between the confronting faces of the spacer stem and the valve member.

14. The valve according to claim 13, wherein said yieldable means comprises axially-extending projections integrally formed on one of said confronting faces and engageable with a yieldable surface formed on the other confronting face.

15. The valve according to claim 14, wherein said projections are integrally formed on the end face of the spacer stem, and the yieldable surface is formed on the outlet face of the valve member.

16. An automatic shut-off valve having a lower closing pressure than an opening pressure, comprising: a housing having an inlet, an outlet, and a partition formed with a valve opening connecting the inlet to the outlet; a valve member movable in the outlet side of the partition to an open or closed position with respect to said valve opening; a piston movable in the outlet side of said partition independently of said valve member and defining a chamber with said partition; said piston being formed with a passageway therethrough establishing communication between the housing outlet and said chamber; and a spring urging said piston towards the valve member and the valve member to its closed position against the force of the inlet pressure; said piston having a larger cross-sectional area than said valve member, such that the valve member opens the valve opening at a predetermined inlet pressure and closes the valve opening at a lower inlet pressure, said valve member being formed with a stem passing through said valve opening in the partition to the inlet side of the housing, said valve opening in the partition comprising a first bore therethrough for accommodating the valve stem and a second bore therethrough having a seat engageable by said valve member, said first bore being of smaller diameter than said second bore.

17. The valve according to claim 16, wherein said valve stem carries a regulator member on the inlet side thereof movable towards and away from the mouth of said first bore to regulate the pressure at the outlet of the housing.

* * * * *